(12) United States Patent
Jonik et al.

(10) Patent No.: US 9,809,175 B2
(45) Date of Patent: Nov. 7, 2017

(54) VEHICLE MOUNTING SYSTEM

(71) Applicant: Havis, Inc., Warminster, PA (US)

(72) Inventors: Bruce Jonik, Canton, MI (US); Stephen Telesco, Dexter, MI (US); Nick Rose, Ann Arbor, MI (US); Tom Muday, Scottsdale, AZ (US)

(73) Assignee: Havis, Inc., Warminster, PA (US)

( * ) Notice: Subject to any disclaimer, the term of this patent is extended or adjusted under 35 U.S.C. 154(b) by 22 days.

(21) Appl. No.: 14/755,354

(22) Filed: Jun. 30, 2015

(65) Prior Publication Data

US 2017/0001576 A1 Jan. 5, 2017

(51) Int. Cl.
*B60R 11/00* (2006.01)
*F16M 11/04* (2006.01)
*B60R 11/02* (2006.01)

(52) U.S. Cl.
CPC ... *B60R 11/0241* (2013.01); *B60R 2011/0071* (2013.01); *B60R 2011/0078* (2013.01); *F16M 11/041* (2013.01)

(58) Field of Classification Search
CPC . B60R 11/02; B60R 11/0241; B60R 11/0252; B60R 2011/0071; F16M 11/041; F16M 13/00; A45C 2011/001–2011/003; A45F 2200/0508–2200/0516
USPC ........................ 224/567, 570; 248/313, 316.5
See application file for complete search history.

(56) References Cited

U.S. PATENT DOCUMENTS

| | | | | |
|---|---|---|---|---|
| 5,695,164 A * | 12/1997 | Hartmann | ............... | B60R 11/00 248/206.4 |
| 8,240,628 B2 * | 8/2012 | Huang | ................. | F16M 11/041 248/122.1 |
| D684,979 S * | 6/2013 | Chun | ........................... | D14/447 |
| D697,515 S * | 1/2014 | Adelman | ..................... | D14/447 |
| 8,752,802 B1 * | 6/2014 | Fan | ......................... | H04M 1/04 248/309.1 |
| 2012/0312950 A1 * | 12/2012 | Sears | .................... | F16M 11/041 248/316.5 |
| 2013/0301216 A1 * | 11/2013 | Trinh | ...................... | A47F 7/0246 361/679.58 |
| 2014/0145050 A1 * | 5/2014 | Hung | .................... | F16M 11/041 248/274.1 |
| 2015/0060624 A1 * | 3/2015 | Huang | ................. | H05K 5/0204 248/316.4 |
| 2016/0108942 A1 * | 4/2016 | Yu | .......................... | F16M 13/00 248/316.4 |

* cited by examiner

*Primary Examiner* — Nathan J Newhouse
*Assistant Examiner* — Phillip Schmidt
(74) *Attorney, Agent, or Firm* — RatnerPrestia

(57) ABSTRACT

Apparatuses and methods for mounting an object within a vehicle are disclosed. One apparatus includes a base, a neck, and a pair of legs. The neck extends from the base, and has a length that is adjustable relative to the base. The legs extend from the base in substantially a same plane as the neck. Each leg has a holding portion configured to hold the object. The legs are rotatable relative to the base such that rotation of one leg causes rotation of the other leg. One method includes positioning the object adjacent a base of a mounting apparatus, adjusting a length of a neck of the apparatus to accommodate the object, and rotating a pair of legs of the apparatus such that holding portions on the legs hold the object, the pair of legs rotatable such that rotation of one leg causes rotation of the other leg.

19 Claims, 10 Drawing Sheets

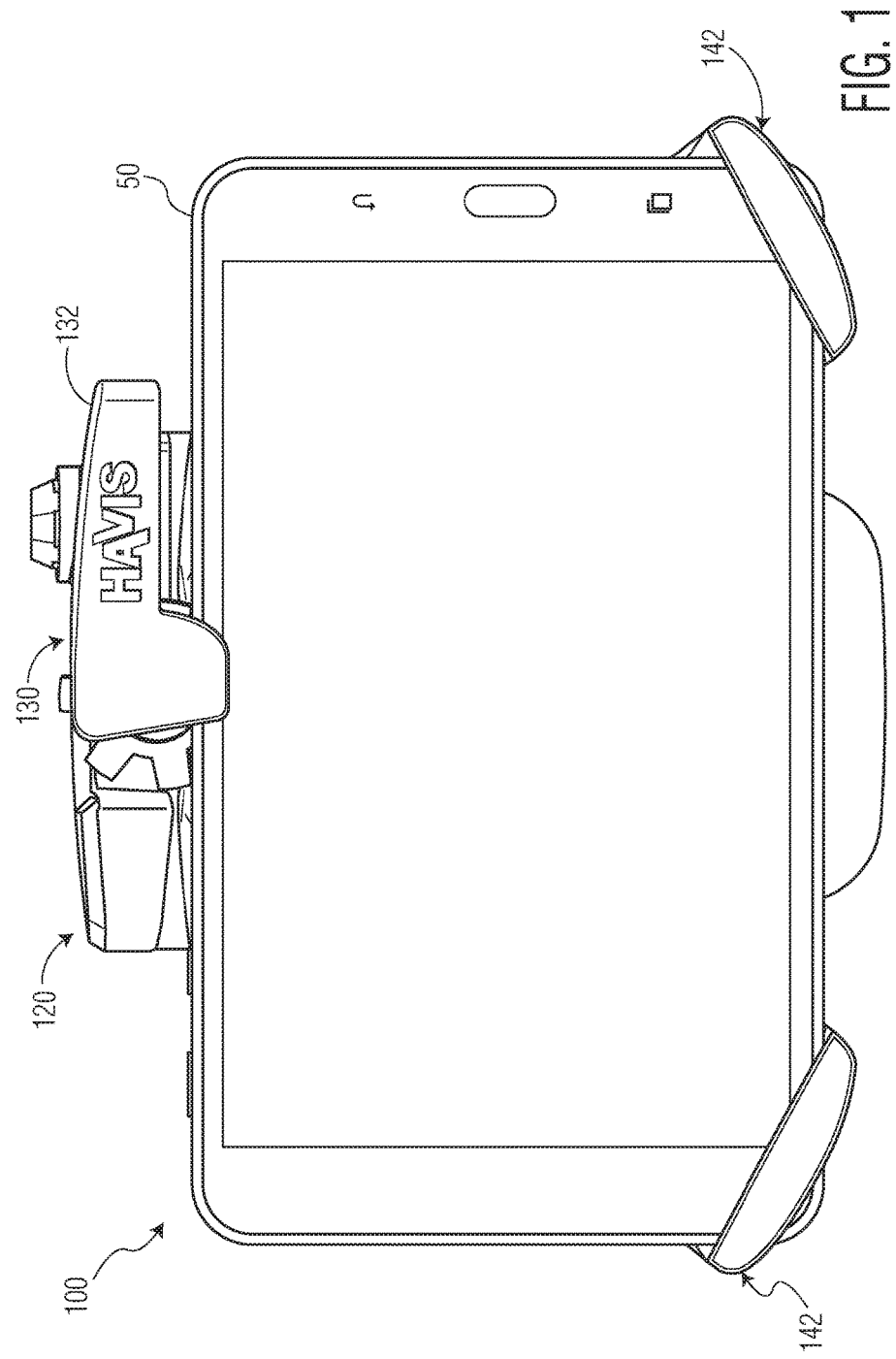

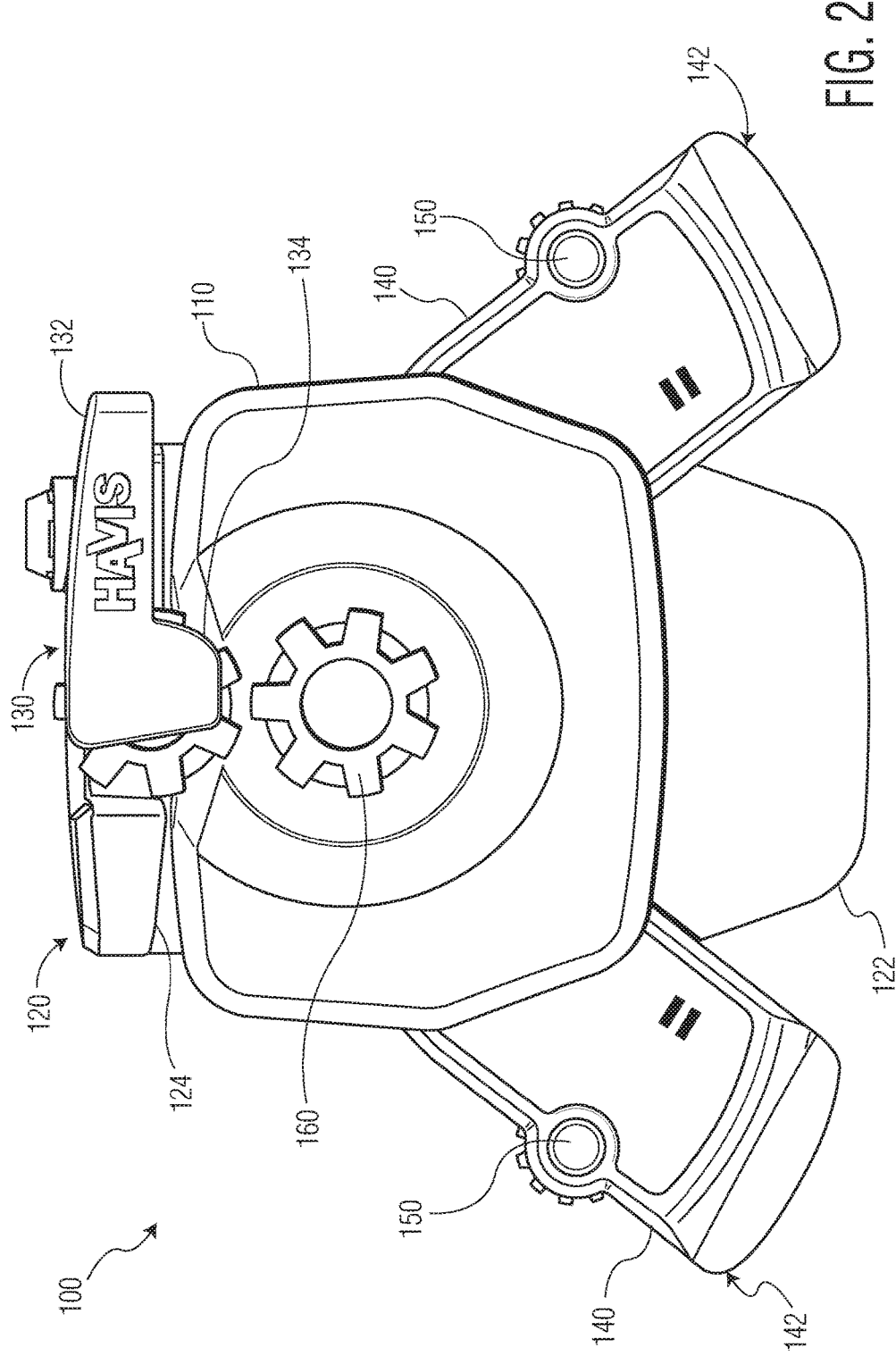

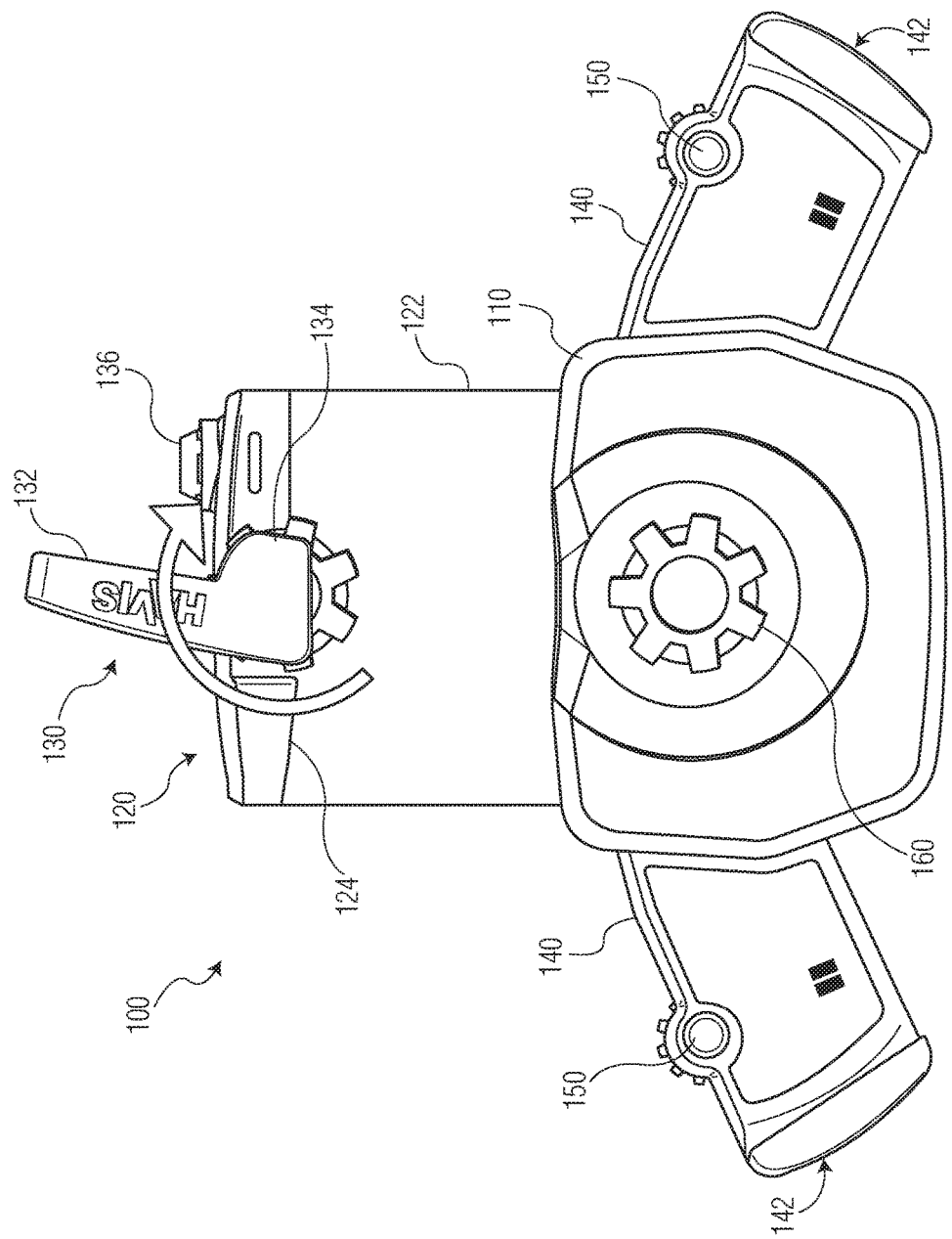

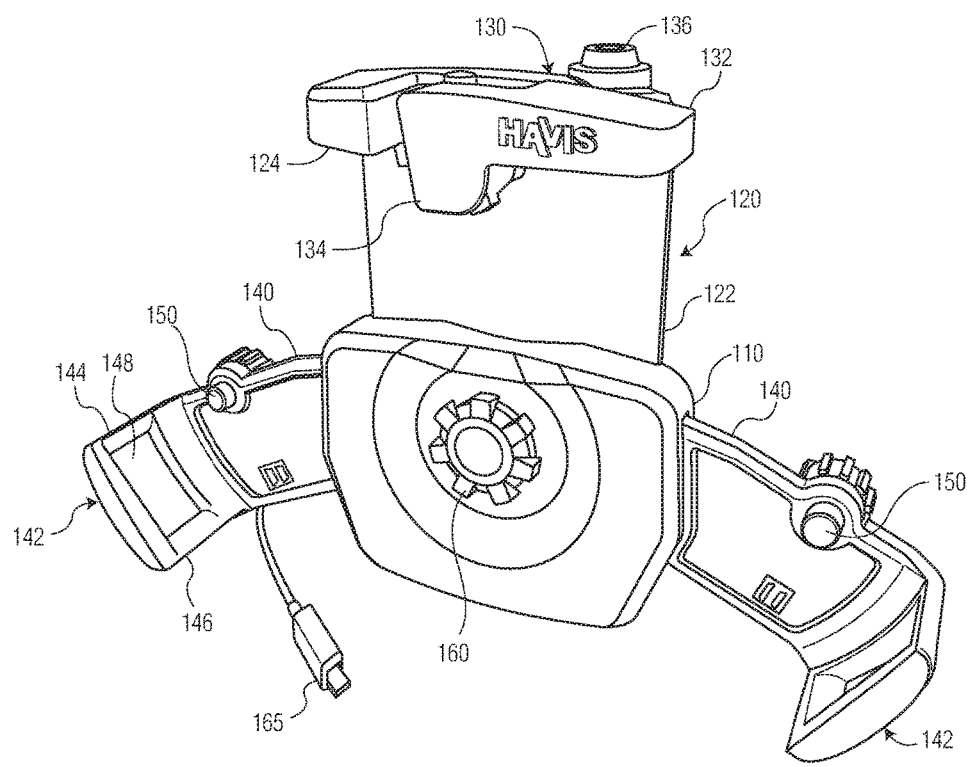

VEHICLE MOUNTING SYSTEM

FIELD OF THE INVENTION

The present invention relates generally to mounting systems, and more particularly, to apparatuses and methods for removably mounting objects within a moving vehicle.

BACKGROUND OF THE INVENTION

Specialized vehicles are an essential tool in many different professions. In particular, professions such as law enforcement commonly utilize a number of specialized electronic systems (e.g., computers, radio systems, sirens) that are not found in conventional automobiles. While vehicles may be specially manufactured that include these systems, these systems may also be added to conventional automobiles through after-market installations. However, one problem that arises from such installations is the simple and effective mounting of after-market electronic devices in conventional vehicles. Improved systems are desired for repositionably mounting objects in vehicles.

SUMMARY OF THE INVENTION

Aspects of the present invention are directed to apparatuses and methods for mounting an object within a vehicle.

In accordance with one aspect of the present invention, an apparatus for mounting an object within a vehicle is disclosed. The apparatus includes a base, a neck, and a pair of legs. The neck extends from the base, and has a length that is adjustable relative to the base. The pair of legs extend from the base in substantially a same plane as the neck. Each leg has a holding portion configured to hold the object. The pair of legs are rotatable relative to the base such that rotation of one leg causes rotation of the other leg.

In accordance with another aspect of the present invention, a method for mounting an object within a vehicle is disclosed. The method includes positioning the object adjacent a base of a mounting apparatus, adjusting a length of a neck of the apparatus to accommodate the object, and rotating a pair of legs of the apparatus such that holding portions on the legs hold the object, the pair of legs rotatable such that rotation of one leg causes rotation of the other leg.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 1 is a plan view of an exemplary apparatus for mounting an object within a vehicle including the mounted object in accordance with aspects of the present invention;

FIGS. 2, 3, and 4 are views of the apparatus of FIG. 1 without the mounted object;

DETAILED DESCRIPTION OF THE INVENTION

Figure 5A:
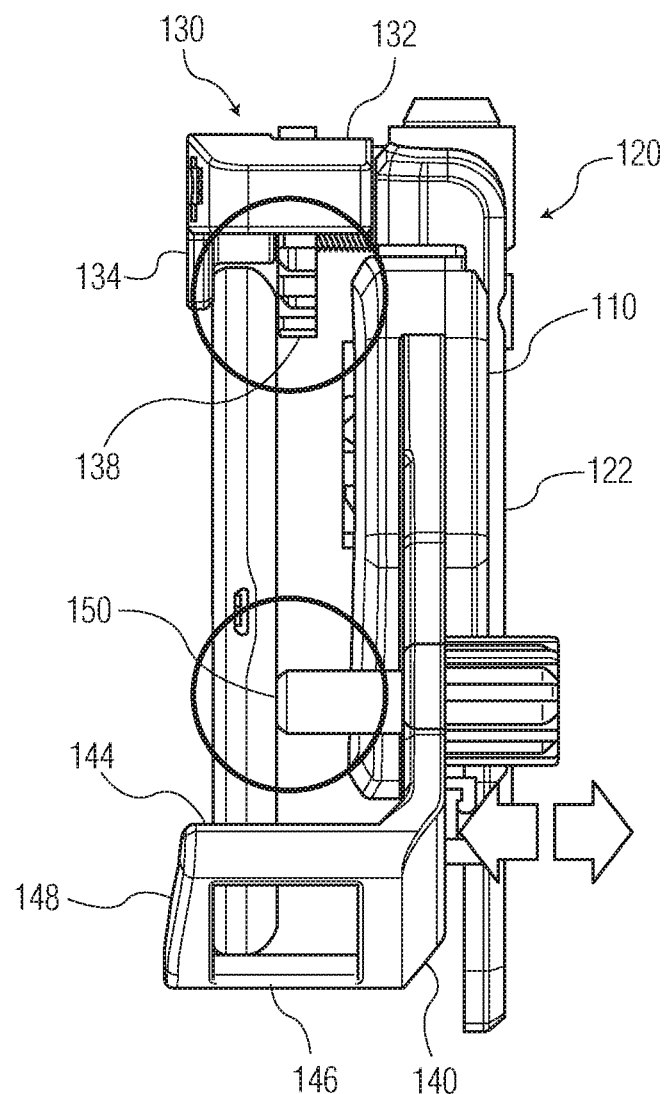
FIGS. 5A and 5B are top and elevated rear views, respectively, of the apparatus of FIG. 1 with an exemplary mounted object.

The apparatuses and methods disclosed herein are usable to mount objects within conventional vehicles (such as automobiles). While the disclosed systems are described herein with respect to mounting within the cabin of a vehicle, it will be understood that the invention is not so limited. To the contrary, aspects of the present invention are usable in any application in which a removable mount is desired.

While any objects may be mounted within the disclosed apparatus and methods, the disclosed mounting systems are particularly suitable for mounting electronic devices, such as tablets or mobile phones. Such devices may be subject to periodic removal from the vehicle, and as such, the disclosed apparatuses and methods advantageously allow such objects to be securely mounted in a vehicle while still being capable of being easily removed when desired. Other electronic devices or objects mountable with the disclosed systems will be known to those of ordinary skill in the art from the description herein.

With reference to the drawings, FIGS. 1-4 illustrates an exemplary apparatus 100 for mounting an object 50 within a vehicle in accordance with aspects of the present invention. Apparatus 100 is usable to securely mount objects, such that they can be readily secured within or removed from the vehicle. Apparatus 100 is usable to securely mount tablets and phones, such as object 50. In general, apparatus 100 includes a base 110, a neck 120, and a pair of legs 140. Additional details of apparatus 100 are provided herein.

Base 110 supports the components of apparatus 100. Base 110 may further provide a surface against which the object can rest while mounted. Base 110 may be sized to substantially cover and/or support a rear surface of the object being mounted. In an exemplary embodiment, base 110 includes a broad, substantially flat piece of rigid material. Suitable materials for forming base 110 will be apparent to one of ordinary skill in the art.

Base 110 may be configured to be mounted to the vehicle through one or more mounting structures (not shown). In an exemplary embodiment, base 110 can be mounted to a repositionable mounting system to enable the object being mounted to be repositioned within the vehicle during use without the need to remove the object from apparatus 100. Suitable repositionable mounting systems for use with the present invention are disclosed in copending U.S. patent application Ser. No. 14/745,839, the contents of which are incorporated herein by reference in their entirety. Other suitable systems and structures for mounting base 110 within a vehicle will be known to one of ordinary skill in the art from the description herein.

Neck 120 extends outward from base 110. Like base 110, neck 120 may provide a surface against which the object can rest while mounted. Neck 120 has a length that is adjustable relative to base 110 in order to accommodate objects having different sizes. Thus, neck 120 enables apparatus 100 to be used to mounted objects having different sizes, or to be used to mount objects in multiple different orientations (e.g., mount tables in portrait or landscape orientation).

In an exemplary embodiment, neck 120 includes an extending portion 122 and a holding surface 124. Extending portion 122 slides upward and downward in FIG. 2 relative to base 110 in order to adjust the length of neck 120. For example, extending portion 122 may ride in one or more grooves on base 110 to enable sliding for adjusting the length of neck 120. Holding surface 124 assists in positioning neck 120 relative to the object being mounted. For example, holding surface 124 may rest against a side edge of the object so that neck 120 can readily be adjusted to have a length larger than the size of the object being mounted. This enables extending portion 122 to cover a substantial portion of the rear surface of the object being mounted.

Neck 120 may include a locking mechanism 130. Locking mechanism 130 is configured to prevent removal of the object from apparatus 100 when the object is positioned against neck 120 and held by legs 140. Locking mechanism 130 prevents removal of the object by preventing the object from being moved away from neck 120. Locking mechanism 130 may work in conjunction with holding surface 124 of neck 120 in order to prevent removal of the object.

In an exemplary embodiment, locking mechanism 130 includes a handle 132 and a tab 134. Handle 132 is rotatable relative to neck 120 between a locked position and an unlocked position, as shown by arrow in FIG. 3. Tab 134 is rigidly coupled to handle 132.

In the locked position, shown in FIG. 2, tab 134 is moved such that the object is positioned between neck 120 and tab 134. In this position, tab 134 blocks the object from being moved outward and away from neck 120. This position of tab 134, in conjunction with the holding performed by legs 140 (and discussed below), prevents removal of the object from apparatus 100.

In the unlocked position, shown in FIG. 3, tab 134 is moved such that it no longer blocks the object from being moved outward and away from neck 120. With the removal of tab 134 from this path, the object can be moved outward from neck 120, and removed from apparatus 100.

Figure 5B:
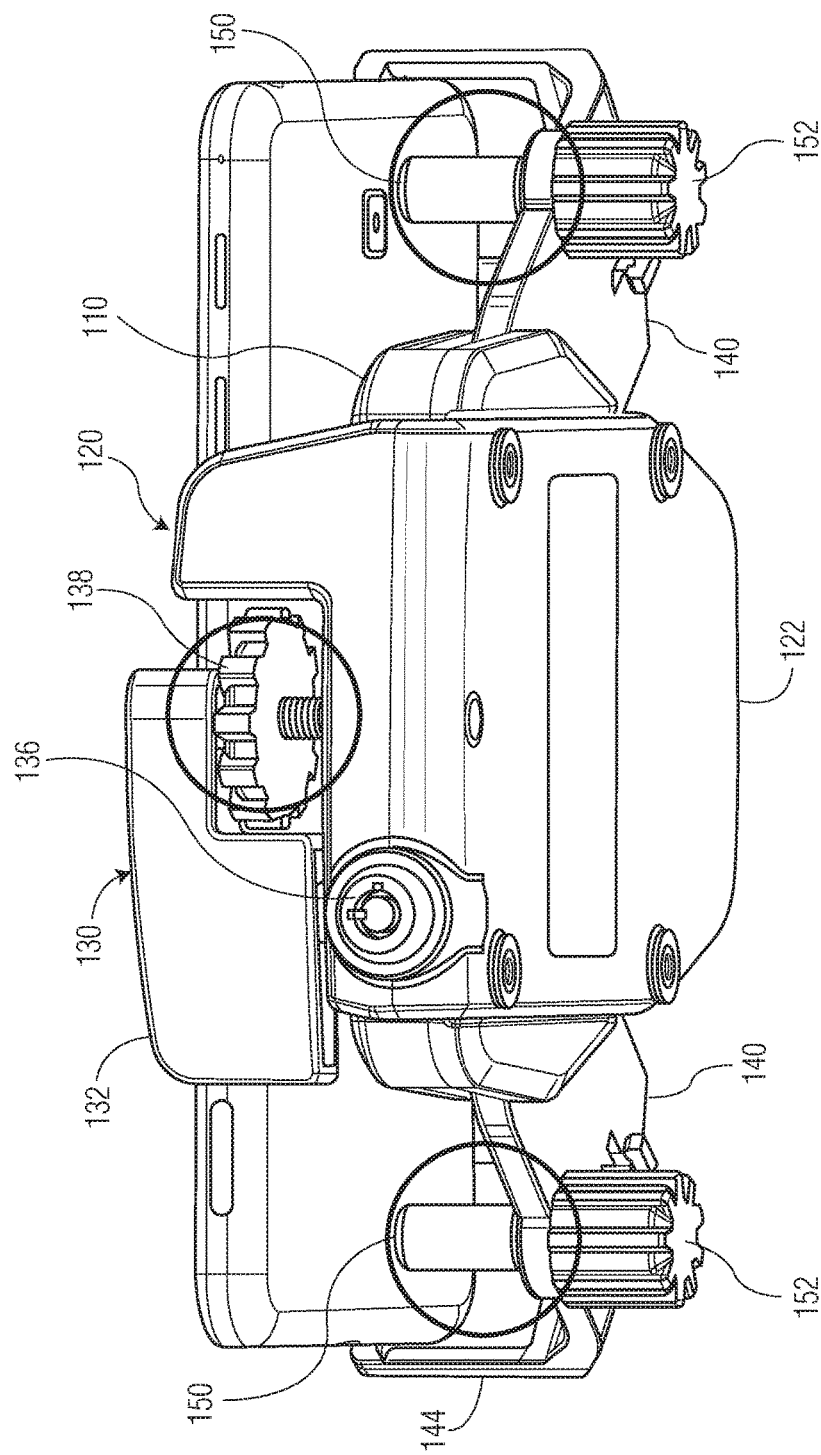

Locking mechanism 130 may further include a lock 136. When handle 132 is rotated to be in the locked position, lock 136 may be actuated to prevent rotation of handle 132 to the unlocked position. Lock 136 thereby prevents unauthorized removal of the mounted object from apparatus 100. In an exemplary embodiment, lock 136 is a keyhole lock, as shown in FIGS. 4 and 5B. However, other locking element for use as lock 136 will be known to one of ordinary skill in the art from the description herein.

Neck 120 may further include a biasing element 138. Biasing element 138 is positioned to bias the mounted object against tab 134 when handle 132 is rotated to be in the locked position. Biasing element 138 prevents movement of the object in the direction orthogonal to the plane of the object after it has been mounted in apparatus 100. This may be desirable in order to prevent rattling or shifting of the mounted object, for example, during movement of the vehicle.

Legs 140 extend from base 110. As shown in FIGS. 2-4, legs 140 extend from base 110 in substantially a same plane of extension as neck 120. Preferably, legs 140 extend from base 110 in directions that are oblique from the direction of extension of neck 120. This enables legs 140 to cooperate with neck 120 to provide at least three coplanar points of contact with the object for securely mounting the object to apparatus 100.

Legs 140 each have a holding portion 142. Holding portion 142 is configured to hold the object being mounted. In an exemplary embodiment, holding portion 142 is configured to hold the corner of an object. In this embodiment, holding portion 142 includes a pair of bars 144 and 146 separated by an opening in which the object's corner can be positioned. One bar 144 provides a first surface positioned to contact one surface of the object, and the other bar 146 provides a second surface positioned to contact a different surface of the object, as shown in FIGS. 5A-6B.

Holding portion 142 preferably further includes a holding surface 148. Holding surface 148 cooperates with locking mechanism 130 to prevent removal of the object from apparatus 100 when the object is positioned against neck 120 and held by holding portions 142 of legs 140. Holding surface 148 prevents removal of the object by preventing the object from being moved away from the respective leg 140.

Figure 6A:
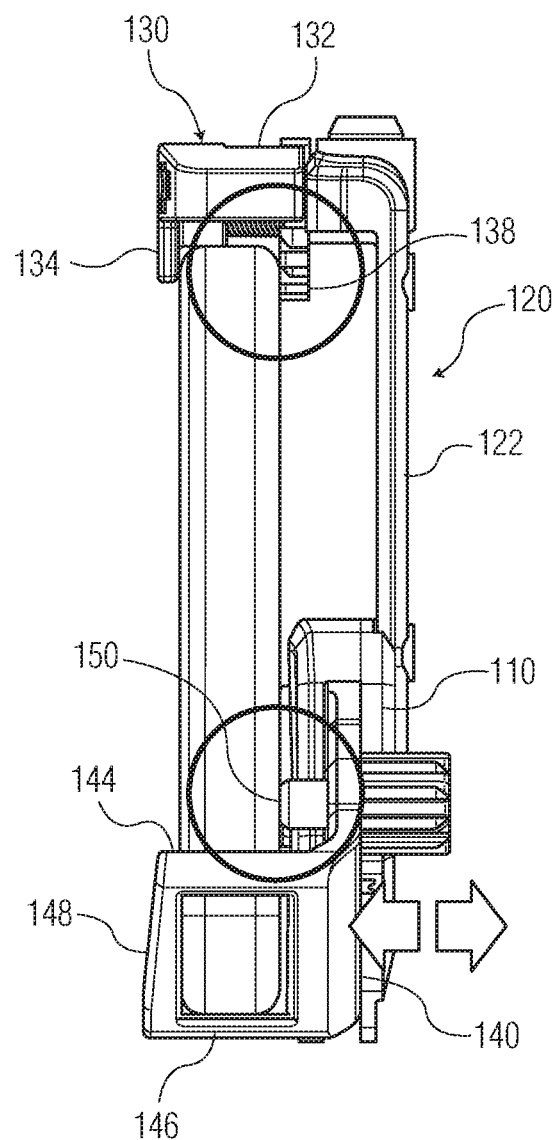
FIGS. 6A and 6B are top and elevated rear views, respectively, of the apparatus of FIG. 1 with another exemplary mounted object.
Figure 6B:
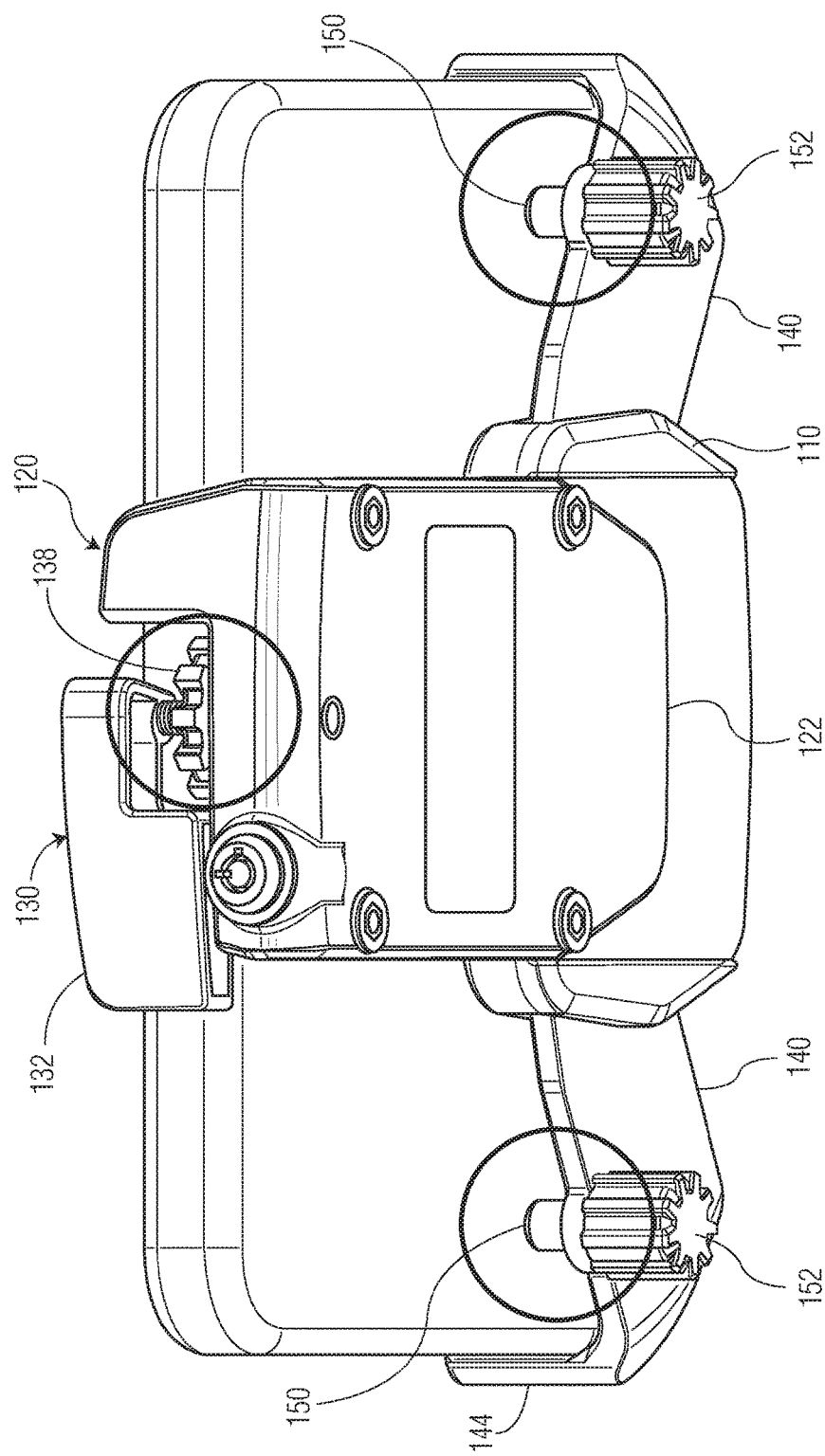

Legs 140 may also each include an adjustable projection 150. Adjustable projection 150 is movable relative to leg 140 between a first position and a second position. Projection 150 is movable in the left/right direction shown by arrows in FIGS. 5A and 6A. Adjustable projection 150 assists in locking the mounted object in place within apparatus 100 by contacting the object. In particular, projection 150 is positioned to contact the surface of the object facing base 110, as shown in FIGS. 5A and 6A.

Figure 7A:
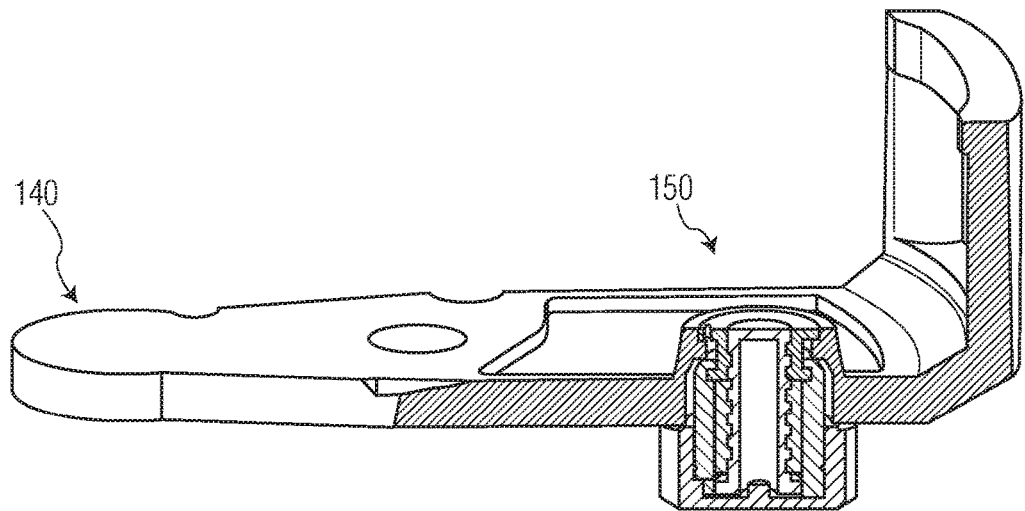
FIGS. 7A and 7B are cross-sectional views of an adjustable projection of the apparatus of FIG. 1.

In the first position, shown in FIG. 7A, adjustable projection 150 is moved away from the mounted object, and is withdrawn into the body of leg 140. In this position, projection 150 does not exert a locking force on the mounted object.

Figure 7B:
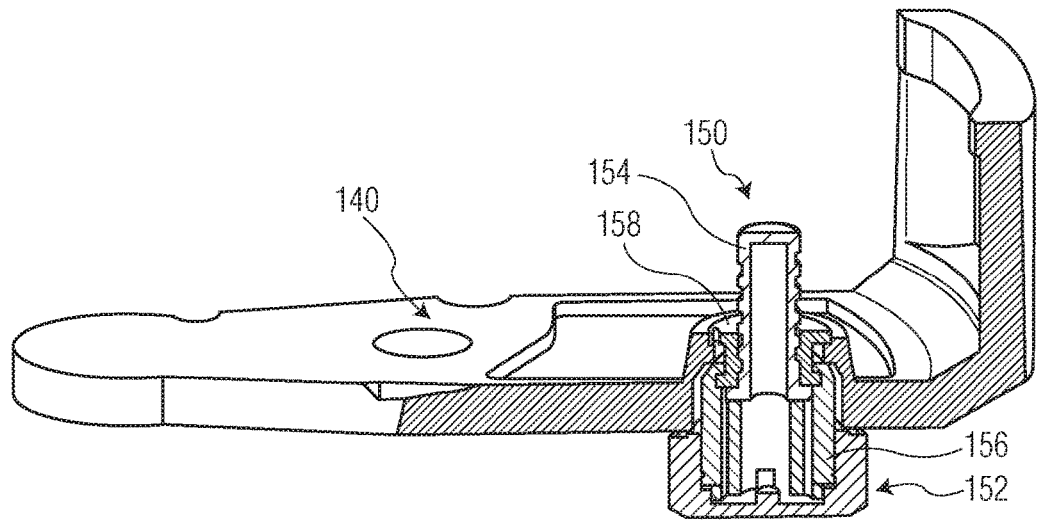

In the second position, shown in FIG. 7B, adjustable projection 150 is moved toward the mounted object, and is extended from the body of leg 140. In this position, projection 150 exerts a locking force on the mounted object. Preferably, projection 150 exerts the locking force on the object by pressing the mounted object against the holding surface 148 of each leg 140, as shown in FIGS. 5A-6B. As discussed above with respect to biasing element 138, adjustable projection 150 desirably prevents movement of the object in the direction orthogonal to the plane of the object after it has been mounted in apparatus 100. The contact between the mounted object and either biasing element 138 or adjustable projections 150 is shown within circles in FIGS. 5A-6B.

In an exemplary embodiment, adjustable projection 150 includes a knob 152 and a threaded post 154, as shown in FIGS. 7A and 7B. The knob 152 is mounted on a surface of leg 140, and is rotatable relative to leg 140. Threaded post 154 is rotatably coupled to knob 152 in such a manner that rotation of knob 152 moves the threaded post 154 between the first and second positions.

Threaded post 154 may be coupled to knob 152 via one or more intervening elements. In a preferred embodiment, adjustable projection 150 further includes a split clamp 156 and a split collar 158. Split clamp 156 is rigidly coupled to knob 152 such that split clamp 156 rotates with knob 152. Split clamp 156 defines within a channel in which the head of threaded post 154 is axially movable. Split clamp 156 is coupled to threaded post 154 using non-rotation features (such as keying features), such that rotation of split clamp 156 causes rotation of threaded post 154 without restricting axial movement of threaded post 154. Split collar 158 is rigidly coupled to leg 140. Threaded post 154 is rotatably received within grooves defined by split collar 158. In this embodiment, When knob 152 is rotated, split clamp 156 rotates, which rotates threaded post 154. As threaded post 154 rotates, it rides within grooves defined by split collar 158, and axially moves between the first and second positions.

The above description of the operation of adjustable projection 150 is provided for the purposes of illustration, and is not intended to be limited. To the contrary, other mechanisms for adjusting the position of a projection will be understood by one of ordinary skill in the art from the description herein, and are within the scope of the present invention.

Legs 140 are rotatable relative to base 110. Legs 140 are coupled to one another such that rotation of one leg 140 causes rotation of the other leg 140. For example, and with reference to FIG. 2, when the left leg 140 is rotated in the clockwise direction, the right leg 140 is rotated in the counterclockwise direction. In this manner, the angle of a respective leg 140 relative to neck 120 is mirrored by the other leg 140.

Legs 140 may each include a respective gear. Each gear is affixed to its respective leg 140 in a manner to prevent rotation of the gear relative to the leg 140. In an exemplary embodiment, the gears are integrally molded on an end of their respective legs 140. In order to achieve the coupled rotation of legs 140 described above, the gear of one leg 140 is rotatably coupled (or engaged) with the gear of the other leg.

Legs 140 may also include a structure for holding a charging cable 165 for connection to the object to be mounted. In one embodiment, charging cable 165 may be held by the holding portion 142 on each leg 140. In an alternative embodiment, legs 140 may include separate structures on legs 140 for holding charging cable 165. Cable 165 may be adjustable to a desired length to enable easy connection to the mounted object.

Apparatus 100 is not limited to the above-described components, but may include alternative or additional components, as would be understood by one of ordinary skill in the art from the description herein.

Apparatus 100 may include a clamping knob 160. Clamping knob 160 is coupled to base 110. Clamping knob 160 cooperates with a clamping surface in order to clamp neck 120 and legs 140 in place. In particular, clamping knob 160 is rotatable between a clamped position and an unclamped position. In the clamped position, clamping knob 160 pulls the clamping surface against base 110, thereby clamping neck 120 and legs 140 in place. This desirably prevents movement of neck 120 or legs 140 when an object is mounted to apparatus 100. In the unclamped position, clamping knob 160 pushes the clamping surface away from base 110, thereby allowing neck 120 and legs 140 to freely move relative to base 110.

Figure 8:
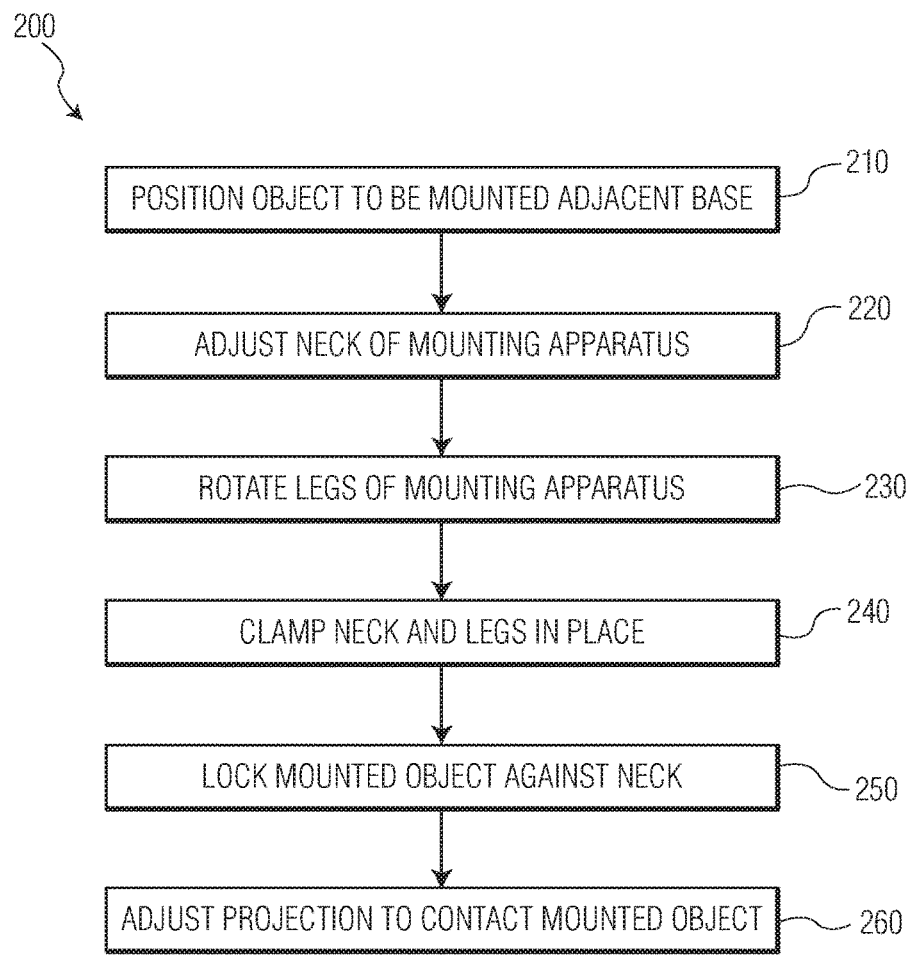
FIG. 8 is a flow chart of an exemplary method for mounting an object within a vehicle in accordance with aspects of the present invention.

FIG. 8 illustrates an exemplary method 200 for mounting an object within a vehicle in accordance with aspects of the present invention. Method 200 is usable to securely mount objects, such that they can be readily secured within or removed from the vehicle. Like apparatus 100, method 200 is usable to securely mount tablets and phones. In general, method 200 includes positioning the object, adjusting the neck, and rotating the legs. Additional details of method 200 are provided herein with reference to the components of apparatus 100.

In step 210, the object to be mounted is positioned adjacent the base of a mounting apparatus. In an exemplary embodiment, object 50 is positioned adjacent base 110 of apparatus 100.

In step 220, the neck of the mounting apparatus is adjusted. In an exemplary embodiment, the length of neck 120 is adjusted to accommodate the object 50. Neck 120 may be adjusted such that holding surface 124 of neck 120 rests against the side of object 50.

In step 230, the legs of the mounting apparatus are rotated. In an exemplary embodiment, legs 140 are rotated until the holding portions 142 on each leg engaged with and hold object 50. As set forth above, legs 140 are rotatably coupled such that rotation of one leg 140 causes rotation of the other leg 140.

In a preferred embodiment, legs 140 are rotated such that they extend in directions from base 110 that are oblique from a direction of extension of neck 120. Legs 140 are preferably rotated such that a corner of object 50 is positioned in each holding portion 142.

Method 200 is not limited to the above-described steps, but may include alternative or additional steps, as would be understood by one of ordinary skill in the art from the description herein.

For example, in step 240, the neck and legs are clamped in place. In an exemplary embodiment, clamping knob 160 is rotated in order to clamp neck 120 and legs 140 in place. This prevents adjustment of the length of neck 120, and rotation of legs 140, so that they maintain their position in holding object 50.

For another example, in step 250, the mounted object is locked against the neck. In an exemplary embodiment, object 50 is locked against neck 120 using locking mechanism 130. Handle 132 may be rotated from the unlocked position to the locked position, until object 50 is positioned between tab 134 and neck 120. Tab 134 thereby prevents movement of object 50 away from neck 120, maintaining object 50 as mounted to apparatus 100.

For yet another example, in step 260, a projection is adjusted to contact the mounted object. In an exemplary embodiment, projection 150 is adjusted to exert a locking force on object 50. The locking force may be exerted on a surface of object 50 facing base 110, in order to prevent rattling or shifting of object 50, for example, during movement of the vehicle.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An apparatus for mounting an object within a vehicle comprising:
   a base;
   a neck extending from the base, the neck having a length that is adjustable relative to the base;
   a pair of legs extending from the base in substantially a same plane as the neck, each leg having a holding portion configured to hold the object, the pair of legs rotatable relative to the base such that rotation of one leg causes rotation of the other leg; and
   a clamping knob coupled to the base, the clamping knob movable between a clamped position in which the neck and legs are held in place relative to the base, and an unclamped position in which the length of the neck is freely adjustable relative to the base and the legs are freely rotatable relative to the base.

2. The apparatus of claim 1, wherein the neck extends from the base in a first direction, and the pair of legs extend from the base in directions that are oblique from the first direction.

3. The apparatus of claim 1, wherein the neck comprises a locking mechanism configured to prevent removal of the object from the apparatus when the object is held by the holding portions and positioned against the neck.

4. The apparatus of claim 3, wherein the locking mechanism comprises:
a handle rotatable relative to the neck between a locked position and an unlocked position; and
a tab coupled to the handle, wherein rotation of the handle to the locked position moves the tab such that the object is positioned between the neck and the tab.

5. The apparatus of claim 4, wherein the neck further comprises a biasing element, the biasing element positioned to bias the object against the tab when handle is in the locked position.

6. The apparatus of claim 1, wherein the holding portion of each leg comprises a first surface positioned to contact one surface of the object, and a second surface positioned to contact a different surface of the object.

7. The apparatus of claim 1, wherein each leg further comprises an adjustable projection, the projection adjustable between a first position in which the projection does not exert a locking force on the object and a second position in which the projection exerts a locking force on the object.

8. The apparatus of claim 7, wherein the adjustable projection is positioned to contact a surface of the object facing the base.

9. The apparatus of claim 8, wherein each adjustable projection comprises:
a knob rotatable relative to the leg; and
a threaded post coupled to the knob such that rotation of the knob moves the threaded post between the first position and the second position.

10. The apparatus of claim 1, wherein each leg comprises a gear affixed thereto, the gear of one leg rotatably coupled with the gear of the other leg.

11. The apparatus of claim 10, wherein the gear of each leg is integrally molded on an end of the respective leg.

12. A method for mounting an object within a vehicle comprising:
positioning the object adjacent a base of a mounting apparatus;
adjusting a length of a neck of the apparatus to accommodate the object;
rotating a pair of legs of the apparatus such that holding portions on the legs hold the object, the pair of legs rotatable such that rotation of one leg causes rotation of the other leg; and
clamping the neck and legs in place by moving a clamping knob coupled to the base from an unclamped position in which the length of the neck is freely adjustable relative to the base and the legs are freely rotatable relative to the base to a clamped position in which the neck and legs are held in place relative to the base.

13. The method of claim 12, wherein the rotating step comprises rotating the pair of legs to extend in directions from the base that are oblique from a direction of extension of the neck.

14. The method of claim 12, further comprising the step of locking the object against the neck with a locking mechanism.

15. The method of claim 14, wherein the locking step comprises rotating a handle of the locking mechanism until the object is positioned between a tab of the handle and the neck.

16. The method of claim 12, wherein the rotating step comprises positioning a respective corner of the object in each holding portion.

17. The method of claim 12, further comprising the step of adjusting a projection on each leg to exert a locking force on the object.

18. The method of claim 17, wherein the adjusting step comprises adjusting the projection to exert a locking force on a surface of the object facing the base.

19. The apparatus of claim 4, wherein the locking mechanism further comprises a lock configured to prevent rotation of the handle relative to the neck.

* * * * *